US012652541B2

(12) United States Patent　　　(10) Patent No.:　US 12,652,541 B2

Angelo et al.　　　　　　　　　(45) Date of Patent:　　Jun. 9, 2026

(54) USING CROSS-CHANNEL ANALYSIS TO DETECT ATTACKS ON SPREAD-SPECTRUM NETWORKS

(71) Applicant: MICRO FOCUS LLC, Santa Clara, CA (US)

(72) Inventors: Michael F Angelo, Houston, TX (US); Douglas Max Grover, Rigby, ID (US)

(73) Assignee: Micro Focus LLC, Santa Clara, CA (US)

( * ) Notice: Subject to any disclaimer, the term of this patent is extended or adjusted under 35 U.S.C. 154(b) by 210 days.

(21) Appl. No.: 18/238,806

(22) Filed: Aug. 28, 2023

(65) Prior Publication Data

US 2025/0080985 A1　　Mar. 6, 2025

(51) Int. Cl.
H04W 24/08　　(2009.01)
H04B 1/69　　(2011.01)
H04W 12/122　　(2021.01)

(52) U.S. Cl.
CPC ............ H04W 12/122 (2021.01); H04B 1/69 (2013.01); H04W 24/08 (2013.01)

(58) Field of Classification Search
CPC ....... H04W 12/122; H04W 24/08; H04B 1/69
USPC ........................................ 455/410
See application file for complete search history.

(56) References Cited

U.S. PATENT DOCUMENTS

| | | | | |
|---|---|---|---|---|
| 9,036,680 B2 * | 5/2015 | Mesecher | ............ | H04B 7/0634 375/146 |
| 2004/0062299 A1 * | 4/2004 | McDonough | .......... | H04B 1/708 375/150 |
| 2005/0111405 A1 * | 5/2005 | Kanterakis | ......... | H04B 1/71075 375/E1.031 |
| 2019/0349334 A1 | 11/2019 | Touboul | | |
| 2020/0304527 A1 | 9/2020 | Santavicca et al. | | |
| 2020/0329482 A1 * | 10/2020 | Moradi | ............... | H04J 13/0062 |
| 2021/0382989 A1 | 12/2021 | Wei et al. | | |

(Continued)

OTHER PUBLICATIONS

"SafeGuard Cyber Launches New Tool to Detect, Defend Against Cross-Channel Cyber Threats," DarkReading, Mar. 5, 2019, 10 pages [retrieved online Aug. 28, 2024 from: https://www.darkreading.com/threat-intelligence/safeguard-cyber-launches-new-tool-to-detect-defend-against-cross-channel-cyber-threats].

(Continued)

*Primary Examiner* — Don N Vo
(74) *Attorney, Agent, or Firm* — Sheridan Ross P.C.

(57)　　　　ABSTRACT

Data of a plurality of channels of a spread-spectrum network are received. For example, the data of the plurality of channels of the spread-spectrum network may be captured by a spread-spectrum router (e.g., a WiFi router). The data of the plurality of channels of the spread-spectrum network is analyzed to identify an anomalous cross-channel pattern across the plurality of channels of the spread-spectrum network. For example, the attack may be a sequential attack across each of the channels of the spread-spectrum network. In response to identifying the anomalous cross-channel pattern across the plurality of channels of the spread-spectrum network, an action is taken to protect the spread-spectrum network. For example, the action may be to notify an administrator of the spread-spectrum network that a potential attack is occurring on the spread-spectrum network or to block access to the spread-spectrum router.

20 Claims, 11 Drawing Sheets

(56)                    References Cited

U.S. PATENT DOCUMENTS

2022/0337610 A1    10/2022  Lotem et al.

OTHER PUBLICATIONS

International Search Report and Written Opinion for International
(PCT) Patent Application No. PCT/US2023/031623, dated May 30,
2024, 7 pages.

* cited by examiner

USING CROSS-CHANNEL ANALYSIS TO DETECT ATTACKS ON SPREAD-SPECTRUM NETWORKS

FIELD

The disclosure relates generally to computer network security and particularly to security of spread-spectrum networks.

BACKGROUND

In corporate/private networks, access using broadband wired/fiber connections are tightly managed to protect the security of the corporate/private network. However, many corporate/private networks may also include spread-spectrum networks (e.g., WiFi networks). Typically, the WiFi networks are not as diligently managed. In addition, malicious parties can externally monitor wireless spread-spectrum networks. This makes the wireless spread-spectrum networks more susceptible to attacks.

SUMMARY

These and other needs are addressed by the various embodiments and configurations of the present disclosure. The present disclosure can provide a number of advantages depending on the particular configuration. These and other advantages will be apparent from the disclosure contained herein.

Data of a plurality of channels of a spread-spectrum network are received. For example, the data of the plurality of channels of the spread-spectrum network may be captured by a spread-spectrum router (e.g., a WiFi router). The data of the plurality of channels of the spread-spectrum network is analyzed to identify an anomalous cross-channel pattern across the plurality of channels of the spread-spectrum network. For example, the attack may be a sequential attack across each of the channels of the spread-spectrum network. In response to identifying the anomalous cross-channel pattern across the plurality of channels of the spread-spectrum network, an action is taken to protect the spread-spectrum network. For example, the action may be to notify an administrator of the spread-spectrum network that a potential attack is occurring on the spread-spectrum network or to block access to the spread-spectrum router.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term spread-spectrum network can be any type of network that has multiple channels, such as a WiFi network, a Bluetooth network, a cellular network, a powerline network (e.g., HomePlug®), and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
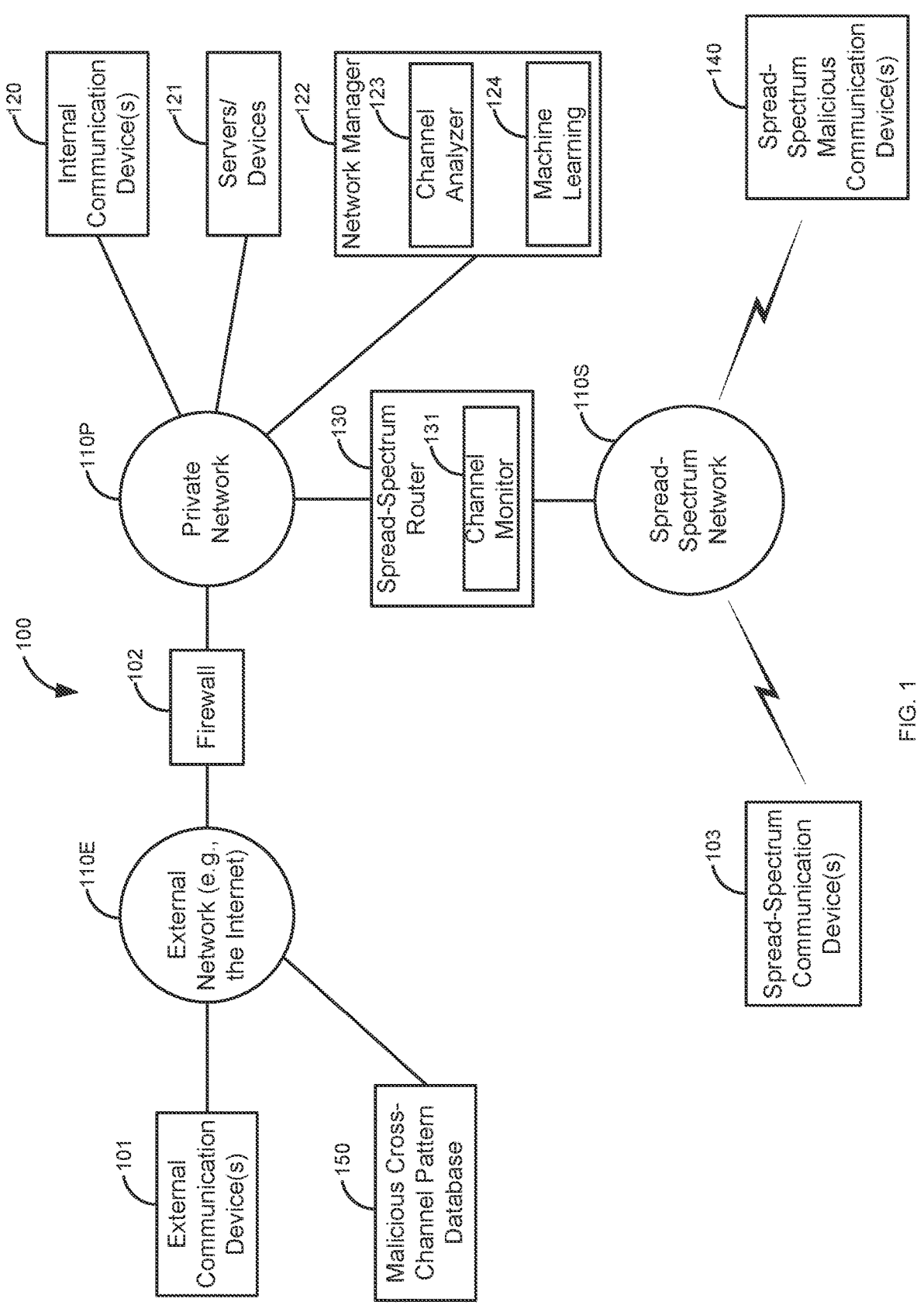
FIG. 1 is a block diagram of a first illustrative system for using cross-channel analysis to detect attacks on spread-spectrum networks.

FIG. 1 is a block diagram of a first illustrative system 100 for using cross-channel analysis to detect attacks on spread-spectrum networks 110S. The first illustrative system 100 comprises external communication device(s) 101, an external network 110E, a firewall 102, a private network 110P, internal communication device(s) 120, servers/devices 121, a network manager 122, a spread-spectrum router 130, spread-spectrum communication device(s) 103, spread-spectrum malicious communication device(s) 140, and a malicious cross-channel pattern database 150.

The external communication device(s) 101 can be or may include any device that can communicate on the external network 110E, such as a Personal Computer (PC), a telephone, a video system, a cellular telephone, a Personal Digital Assistant (PDA), a tablet device, a notebook device, a smartphone, an embedded device, a server, and the like. As shown in FIG. 1, any number of communication external device(s) 101 may be connected to the external network 110E, including only a single communication device 101.

The external network 110E can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The external network 110E can use a variety of electronic protocols, such as Ethernet, Internet Protocol (IP), Hyper Text Transfer Protocol (HTTP), Web Real-Time Protocol (Web RTC), and/or the like. Thus, the external network 110E is an electronic communication network configured to carry messages via packets and/or circuit switched communications.

The firewall 102 can be any device that provides security between the external network 110E and the private network 110P, such as a network address translator, a packet filtering firewall, a circuit-level gateway, an application-level gateway, a stateful inspection firewall, a next-generation firewall, and/or the like. The firewall 102 is used to protect the private network 110P from hackers/malicious parties.

The private network 110P can be or may include any collection of communication equipment that can send and receive electronic communications, such as a Wide Area Network (WAN), a Local Area Network (LAN), a packet switched network, a circuit switched network, a corporate network, a business network, a government network, a combination of these, and the like. The private network 110P can use a variety of electronic protocols, such as Ethernet, Internet Protocol (IP), Hyper Text Transfer Protocol (HTTP), Web Real-Time Protocol (Web RTC), and/or the like. Thus, the private network 110P is an electronic communication network configured to carry messages via packets and/or circuit switched communications.

The internal communication device(s) 120 may be similar devices to the external communication devices 101. The internal communication devices are used by users of the private network 110P.

The servers/devices 121 may be any device that provides services on the private network 110P. For example, the servers/devices 121 may be a web server, a printer, a sensor, and/or the like.

The network manager 122 can be or may include any hardware/software that can manage devices on the private network 110P. The network manager 122 may manage any of the devices 102, 120, 121, 130 on the private network 110P and/or the external network 110E. The network manager 122 further comprises a channel analyzer 123 and machine learning 124.

The channel analyzer 123 is used to analyze data of individual channels of the spread-spectrum network 110S. For example, the spread-spectrum network 110S may be a WiFi network (e.g., a 2.4 Ghz WiFi network 110S that has 14 separate channels). The channel analyzer 123 can analyze the data of channels of the spread-spectrum network 110S to identify normal behavior and/or variances from the normal behavior of the spread-spectrum network 110S.

The machine learning 124 can be any type of machine learning 124 that can be used to identify anomalous behavior on the spread-spectrum network 110S. The machine learning 124 may be used to identify malicious attack patterns on the channels of the spread-spectrum network 110S. The machine learning 124 may use different types of machine learning algorithms, such as supervised machine learning, semi-supervised machine learning, unsupervised machine learning, reinforcement machine learning, and/or the like to identify the malicious attack patterns on the spread-spectrum network 110S.

The spread-spectrum router 130 can be or may include any hardware coupled with software/firmware that provides packet routing/switching between the spread-spectrum network 110S and the private network 110P, such as a WiFi router, a Bluetooth router, a cellular switch, a powerline router, and/or the like. The spread-spectrum router 130 may also provide firewall services. The spread-spectrum router 130 further comprises a channel monitor 131.

The channel monitor 131 monitors individual channels of the spread-spectrum network 110S to identify different access patterns on the spread-spectrum network 110S. For example, if the spread-spectrum router 130 is a WiFi router (e.g., a 2.4 Ghz WiFi), the channel monitor 131 will monitor each of the 14 channels. Likewise, if the spread-spectrum network 110S is a cellular network, a powerline network, or a Bluetooth network, the channel monitor 131 will monitor each of the channels of the spread-spectrum network 110S. Although the channel monitor 131 is shown in the spread-spectrum router 130, the channel monitor 131 may reside outside of the spread-spectrum router 130. For example, the channel monitor 131 may be a node on the private network 110P or may be part of the network manager 122.

The spread-spectrum network 110S can be any network that has multiple channels. The spread-spectrum network 110S may be a wireless network, a wired network, a fiber network, a combination of these, and/or the like. The spread-spectrum network 110S may use a variety of protocols, such as Internet Protocol (IP), Hyper Text Transfer Protocol (HTTP), Web Real-Time Protocol (Web RTC), 802.11, and/or the like. The spread-spectrum network 110S is controlled by the spread-spectrum router 130. In FIG. 1, the spread-spectrum communication device(s) 103 and spread-spectrum malicious communication device(s) 140 are connected to the spread-spectrum network 110S via wireless connections.

The spread-spectrum communication device(s) 103 may be any device that can connect to the spread-spectrum network 110S, such as a Personal Computer (PC), a telephone, a video system, a cellular telephone, a Personal Digital Assistant (PDA), a tablet device, a notebook device, a smartphone, an embedded device, a server, and/or the like. In FIG. 1, the spread-spectrum communication device(s) 103 are shown having wireless connections.

The spread-spectrum malicious communication device(s) 140 are any devices that can access the spread-spectrum network 110S. The spread-spectrum malicious communication device(s) 140 are devices that are attempting to access the private network 110P via the spread-spectrum router 130 maliciously. For example, the spread-spectrum malicious communication device 140 may be a device used by a hacker to gain access to the private network 110P to perform some type of malicious behavior, such as, taking files/data from the devices 120/121 on the private communication network 110P.

The malicious cross-channel pattern database 150 is a database that has malicious cross-channel patterns that are known malicious cross-channel patterns. Typically, the known malicious cross-channel patterns that have previously been used to attack a network 110 (e.g., a private network 110P). The malicious cross-channel pattern database 150 is typically provided by a third party (e.g., as part of a cloud service). The malicious cross-channel pattern database 150 can be accessed by different customers to compare to a current cross-channel pattern on the spread-spectrum network 110S to the known malicious cross-channel patterns in the malicious cross-channel pattern database 150.

Figure 2:
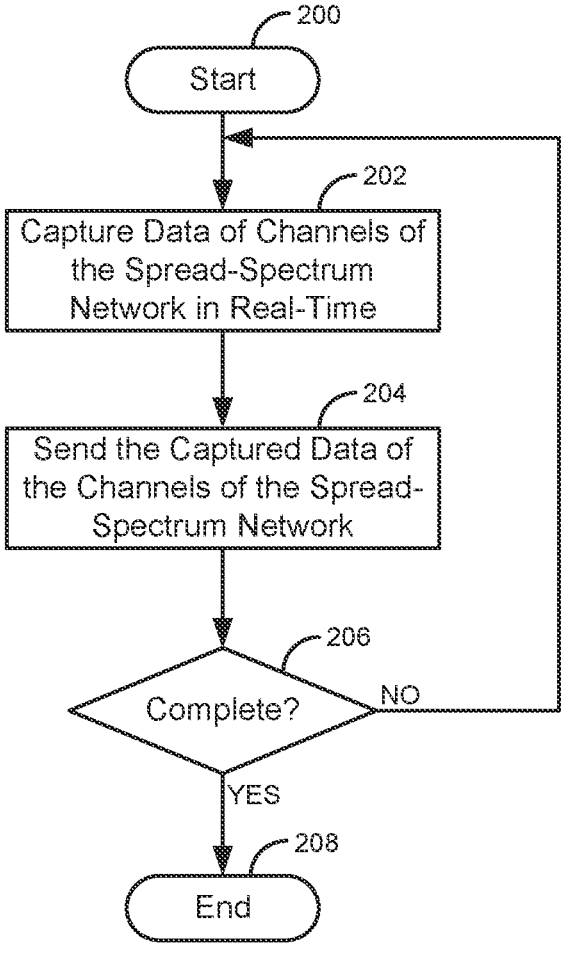
FIG. 2 is a flow diagram of a process for capturing data of channels of a spread-spectrum network in real-time.

FIG. 2 is a flow diagram of a process for capturing data of channels of a spread-spectrum network 110S in real-time. Illustratively, the external communication device(s) 101, the firewall 102, the internal communication device(s) 120, the servers/devices 121, the network manager 122, the channel analyzer 123, the machine learning 124, the spread-spectrum router 130, the channel monitor 131, the spread-spectrum communication device(s) 103, the spread-spectrum malicious communication device(s) 140, and the malicious cross-channel pattern database 150 are stored-program-controlled entities, such as a computer or microprocessor, which performs the method of FIGS. 2-11 and the processes described herein by executing program instructions stored in a computer readable storage medium, such as a memory (i.e., a computer memory, a hard disk, and/or the like). Although the methods described in FIGS. 2-11 are shown in a specific order, one of skill in the art would recognize that the steps in FIGS. 2-11 may be implemented in different orders and/or be implemented in a multi-threaded environment. Moreover, various steps may be omitted or added based on implementation.

The process starts in step 200. The channel monitor 131 captures data of the channels of the spread-spectrum network 110S in real-time in step 202. For example, the channel monitor 131 may monitor all the wireless channels of a WiFi network in real-time. The capturing of step 202 may include capturing some or all of the data sent on the channels of the spread-spectrum network 110S. For example, the channel monitor 131 may capture all of the header information for the data link layer (e.g., Media Access Control (MAC)) addresses, the network layer (e.g., IP addresses), transport layer headers, session layer headers, presentation layer headers, application layer headers (e.g., HTTP headers), payload information, and/or the like. In other words, any of the data (or select portions) sent on the channels of the spread-spectrum network 110S may be captured and analyzed to identify anomalous cross-channel patterns on the spread-spectrum network 110S.

The channel monitor 131 sends, in step 204, the captured data of the channels of the spread-spectrum network 110S to the channel analyzer 123. For example, if the channel monitor 131 is in the spread-spectrum router 130 (or on the private network 110P), the data of the channels of the spread-spectrum network 110S is sent via the private network 110P to the channel analyzer 123. If the channel monitor 131 is part of the network manager 122, the data of the channels of the spread-spectrum network 110S may be sent locally within the network manager 122.

The channel monitor 131 determines, in step 206, if the process is complete. If the process is not complete in step 206, the process of capturing/sending the data of the channels of the spread-spectrum network 110s repeats in steps 202/204. Otherwise, if the process is complete in step 206, the process ends in step 208.

Figure 3:
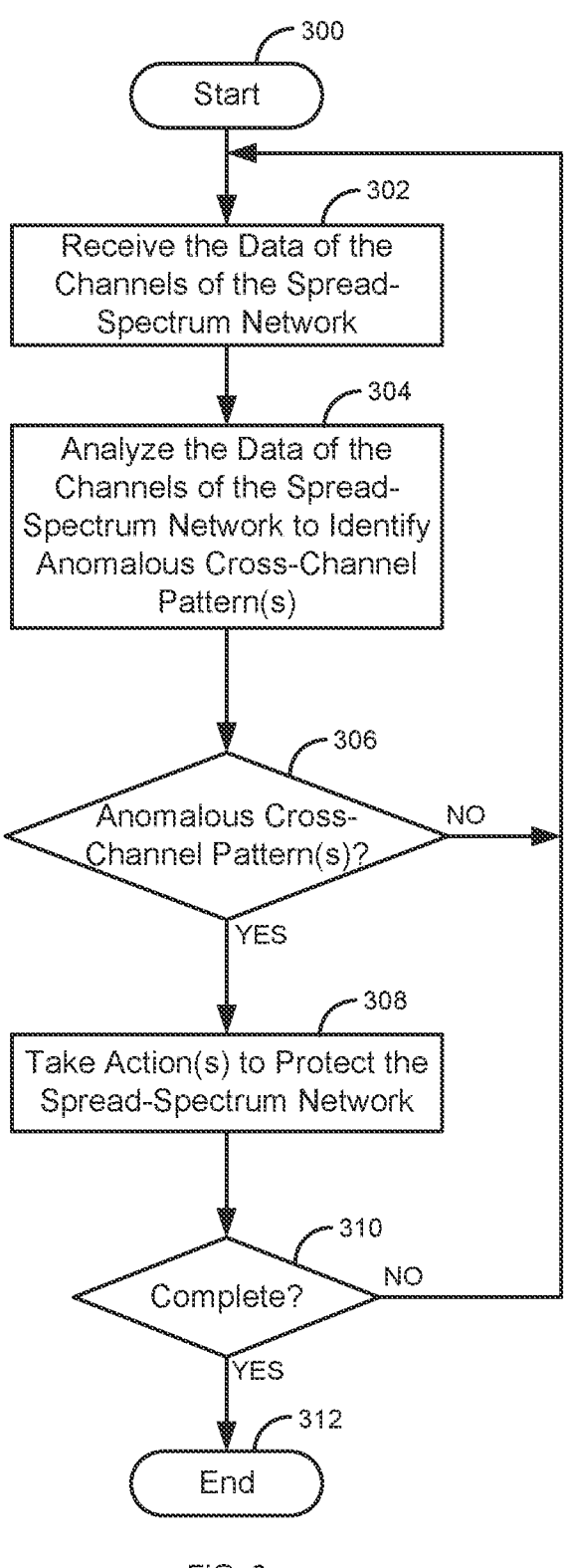
FIG. 3 is a flow diagram of a process for using cross-channel analysis to detect attacks on spread-spectrum networks.

FIG. 3 is a flow diagram of a process for using cross-channel analysis to detect attacks on spread-spectrum networks 1105. The process starts in step 300. The channel analyzer 123 receives (either locally or via the private network 110P), in step 302, the data of the channels of the spread-spectrum network 110S (the data sent in step 204 of FIG. 2).

The channel analyzer 123 analyzes the data of the channels of the spread-spectrum network 110S to identify any anomalous cross-channel patterns in step 304. For example, the anomalous cross-channel patterns may be based on anomalous cross-channel pattern(s) that are received from the malicious cross-channel pattern database 150, may be based on variance(s) from learned (e.g., using the machine learning 124) normal cross-channel pattern(s), and/or the like.

The anomalous cross-channel pattern(s) may vary based on the type of attack. For example, the attack may be a sequential attack where malicious software attacks the first channel, then the second channel, and so on till 14 channel (e.g., doing a ping attack) and then starts all over again (or a reverse sequence, channel 14, 13, . . . to channel 1). An alternative attack may be to use a random sequence attack on the channels (e.g., it randomly attacks all 14 channels and then repeats the random process on all 14 channels again using the same pattern or a new random pattern). The attack algorithm may a sequential attack with the exception of attacking used channels or use a specific attack pattern (random, sequential, and/or the like) on the unused channels. Alternatively, the attack could use some other type of attack that has a unique signature across the channels of the spread-spectrum network 110S. The attack may be a combination of different types of attacks.

In a mesh spread-spectrum network 110S, where a device can take multiple channels (e.g., the spread-spectrum router 130 has two channels), the attack may be against the unused channels not currently being utilized by the spread-spectrum router 130 or may work similar to those discussed above.

The channel analyzer 123 identifies the different malicious cross-channel patterns that are used against the spread-spectrum network 110S. Once a malicious cross-channel pattern is identified, the channel analyzer 123 may look for things like changing MAC addresses and/or new MAC addresses that have not been used previously or registered. For example, the sequential attack may use a different MAC address each time versus a single MAC address for all the cross-channel attack.

By observing the behavior of a devices (e.g., looking at the MAC address and/or IP address) over all the channels spread-spectrum network 110C (e.g., using Coconut or where the channel monitor 131 is actually implemented in the spread-spectrum router 130), anomalous cross-channel patterns can be used to identify a potential denial-of-service attack (e.g., a ping denial-of-service attack) or a probing attack to that is trying to identify open ports. The identified attack patterns may be failed connections across the channels (e.g., to they reach a threshold), ping attacks across the channels, connection attempts across the channels, connection attempts using new ports (at least new on the spread-spectrum network 110S) across the channels, and/or the like. This can include other information, such as using a new port that is only normally used by the firewall 102. For example, a Session Initiation Protocol (SIP) connection is now being made through the WiFi where SIP calls were only made previously through the firewall 102.

Another malicious cross-channel patterns may be if a connection is set up and then uses channel hopping. For example, if there previously was not any channel hopping used on the spread-spectrum network 110S, this may be identified as an anomalous behavior. Another option is where there is an unusual amount of channel hopping than was previously not observed.

The patterns/analysis can be based on not only in-bound connections, but also out-bound connections. For example, if all of a sudden, a new outbound connection using a new port is made on a previously unused channel, this may be flagged as potentially anomalous behavior.

The process could use the machine learning 124 to learn a history of packet data for each of the channels of each of the spread-spectrum networks 110S over time to identify anomalies across the channels. This can be used to detect variances from the learned normal behavior of the spread-spectrum network 110C.

Combinations of the inbound/outbound cross-channel attack patterns may also be used. For example, what types of connections/ports/directions are being used may identify an inbound/outbound cross-channel attack.

Malicious spread-spectrum channel attack patterns can be identified (e.g., similar to virus patterns) and stored in the malicious cross-channel pattern database 150. For example, if a new malicious spread-spectrum attack pattern is learned (e.g., by the machine learning 124), the new malicious spread-spectrum attack pattern can be stored in the malicious cross-channel pattern database 150 so that other users of the malicious cross-channel pattern database 150 can use the new malicious spread-spectrum attack pattern to identify similar types of attacks on their spread-spectrum networks 110S.

If there were not any anomalous cross-channel patterns in step 306, the process goes back to step 302 to receive the data of the channels of the spread-spectrum network 110S. The processing of steps 202-204 and 302-306 may be done in real-time so that any attacks on the spread-spectrum network 110S can be identified in real-time. Real-time identification of attacks is critical because it is important to identify the attack before it occurs instead of after the fact. Post analysis is not as effective because a hacker may have already breached the private network 110P.

Moreover, because of the large amounts of data that is captured on a spread-spectrum network 110S, manual analysis is completely ineffective because it takes too long to analyze the captured cross-channel data of the spread-spectrum network 110S. For example, manual analysis may take months or even years to sort through the massive amount of data that is captured on a spread-spectrum network 110S over long periods of time. Thus, manual analysis cannot be used to effectively stop an attack on a spread-spectrum network 110S.

If there were anomalous cross pattern(s) detected in step 306, one or more actions are be taken to protect the spread-spectrum network 110S in step 308. An action to protect the spread-spectrum network 110S may be to notify an administrator, identifying a port being attacked, identifying a device on the spread-spectrum network 110S/private network 110P instigating the attack, denying a particular device from accessing the spread-spectrum network 110S, closing a port on the spread-spectrum router 130 and/or firewall 102, shutting down access to the spread-spectrum network 110s (or multiple spread-spectrum networks 110S), and/or the like.

The channel analyzer 123 determines, in step 310, if the process is complete. If the process is not complete in step 310, the process goes back to step 302. Otherwise, if the process is complete in step 310, the process ends in step 312.

Figure 4:
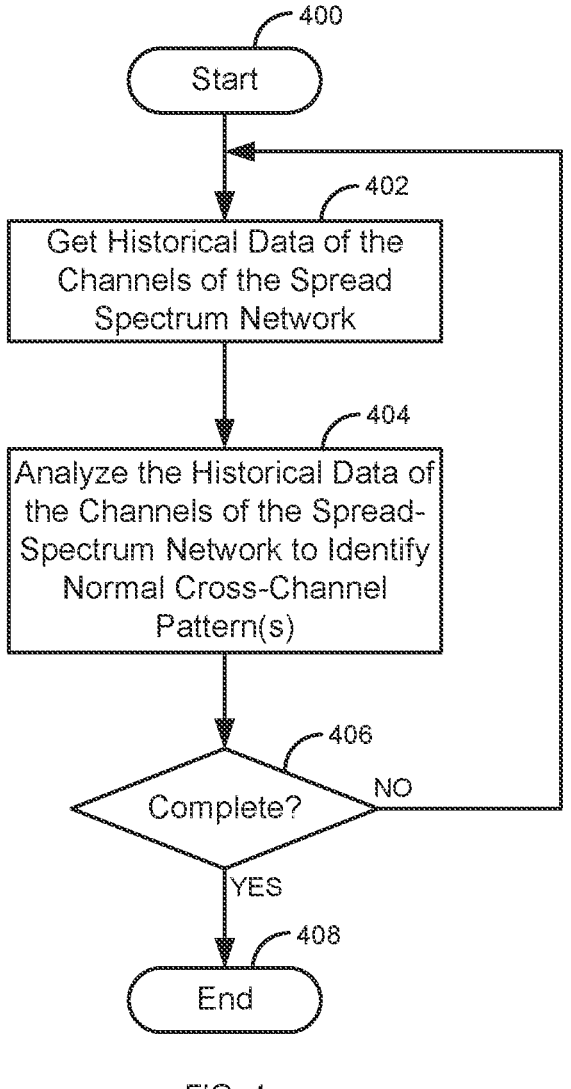
FIG. 4 is a flow diagram of a process for getting historical data of a spread-spectrum network to identify cross-channel patterns.

FIG. 4 is a flow diagram of a process for getting historical data of a spread-spectrum network 110s to identify cross-channel patterns. The process starts in step 400. The channel analyzer 123 gets historical data of the channels of the spread-spectrum network 1105 in step 402. For example, the channel monitor 131 may have collected and stored the historical data of the channels of the spread-spectrum network 1105 over a period of time.

The channel analyzer 123 analyzes the historical data of the channels of the spread-spectrum network 1105 to identify normal cross-channel pattern(s) in step 404. The normal cross-channel patterns may be based on how the spread-spectrum communication device(s) 103 access the spread-spectrum network 1105 over time. The analyzing can include tracking different types of information, such as MAC addresses, IP addresses, application layer addresses (e.g., a SIP address), ports used, protocols used, access times, devices accessed 120/121, resources accessed, login credentials used, usernames, encryption keys used, and/or the like. In addition, the normal cross-channel patterns may be learned based on how the devices 120/121 access the spread-spectrum communication device(s) 103 on the spread-spectrum network 1105 (i.e., outbound connections).

The channel analyzer 123 determines, in step 406, if the process is complete. If the process is not complete in step 406, the process goes back to step 402. Otherwise, if the process is complete in step 406, the process ends in step 408.

Figure 5:
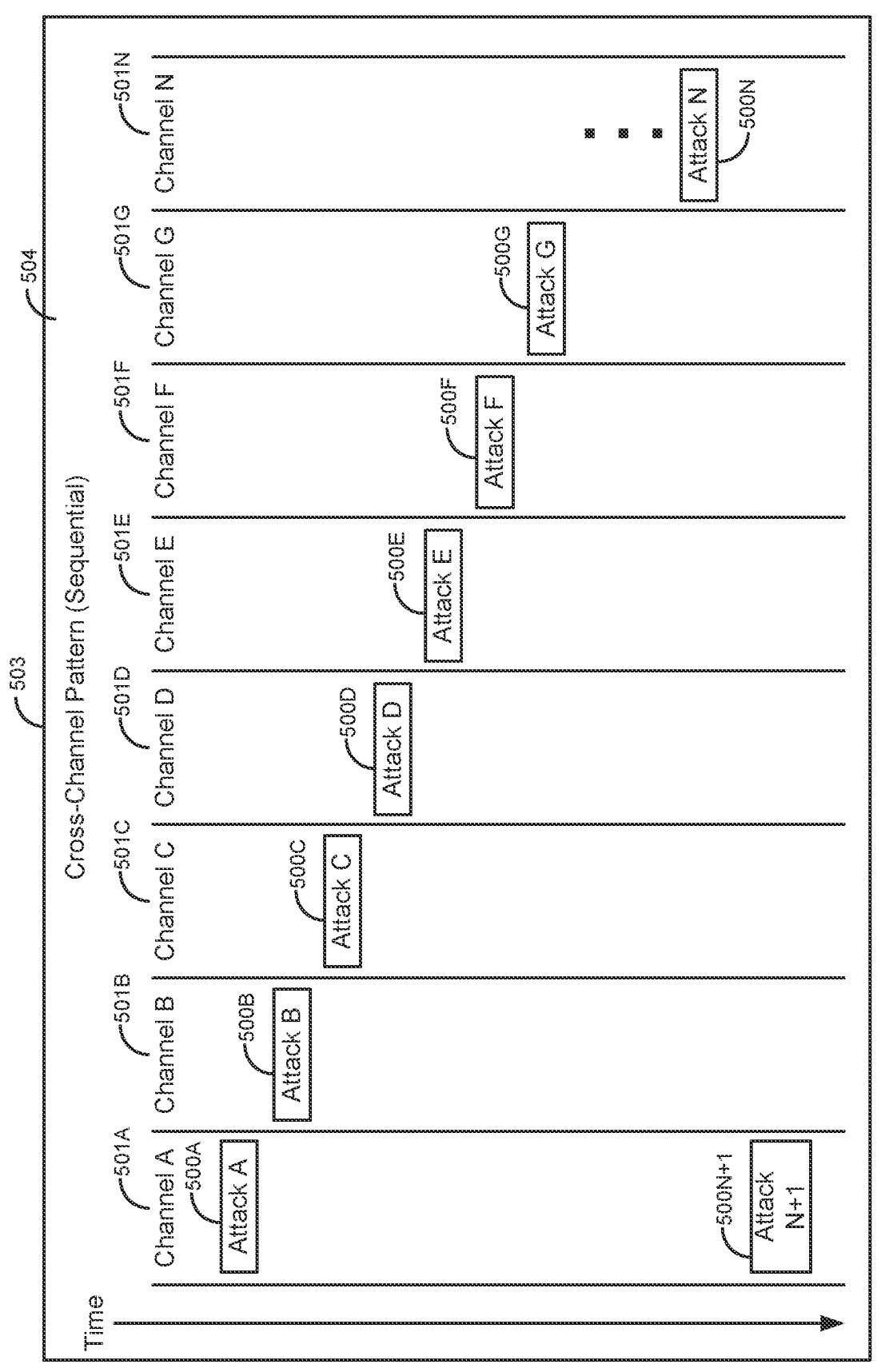
FIG. 5 is a diagram of a graphical user interface that shows a time view of an anomalous sequential cross-channel pattern.

FIG. 5 is a diagram of a graphical user interface 503 that shows a time view of an anomalous sequential cross-channel pattern 504. The time view of a sequential cross-channel pattern 504 comprises attacks 500A-500N+1 and channels 501A-501N. The channels 501A-501N are graphical representations of the channels of the spread-spectrum network 1105. In this example, there are N channels (e.g., N would be 14 for a 2.4 Ghz WiFi network 1105). In FIG. 5, the time view of a sequential cross-channel pattern 504 shows the attacks 500A-500N+1 over time. In this example, the attack A (500A) occurs first in the channel A 501A and sequentially continues in time for each of the channels 501B-501N. The time view of a sequential cross-channel pattern 504 then starts over in the channel A (501A) with attack 500N+1. Although shown starting with the channel A (501A) and ending with channel N (501N), the time view of a sequential cross-channel pattern 504 may start with the channel N (501N) and move sequentially back to the channel A (501) (e.g., in a reverse order) and then repeat with an attack on the channel N (501N).

Figure 6:
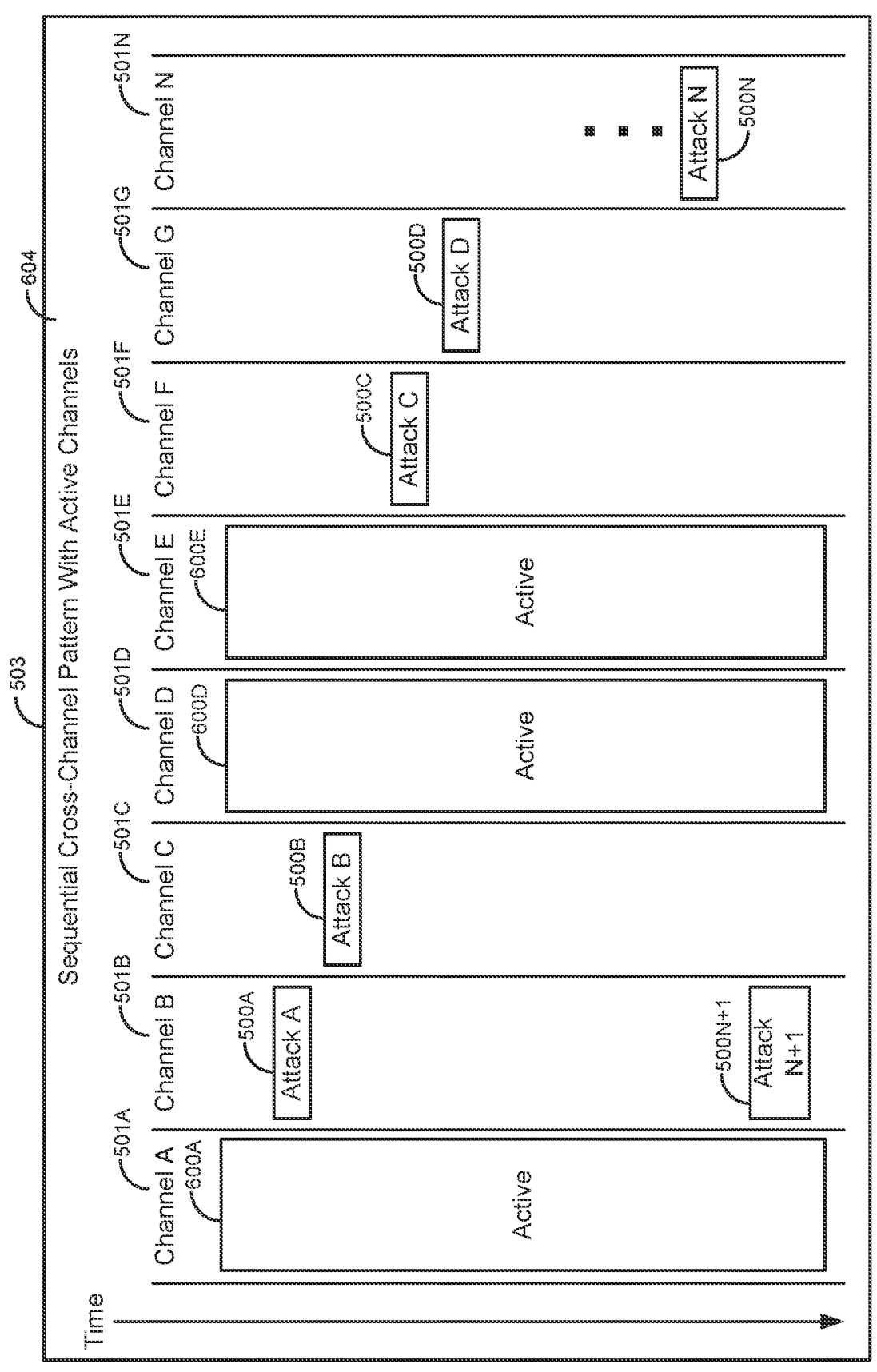
FIG. 6 is a diagram of a graphical user interface that shows a time view of an anomalous sequential cross-channel pattern with active channels.

FIG. 6 is a diagram of a graphical user interface 503 that shows a time view of an anomalous sequential cross-channel pattern with active channels 604. The time view of a sequential cross-channel pattern with active channels 604 has the attacks 501A-501N and the channels 501A-101N. In FIG. 6, the attacks 501A-501N skip the active channels 501A, 501D, and 501E (indicated by the active channels 600A, 600D, and 600E). In this example, the attack 500N+1 shows the repeat of the malicious cross-channel pattern. Like described above, a reverse process may also work where there are active channels 600.

Figure 7:
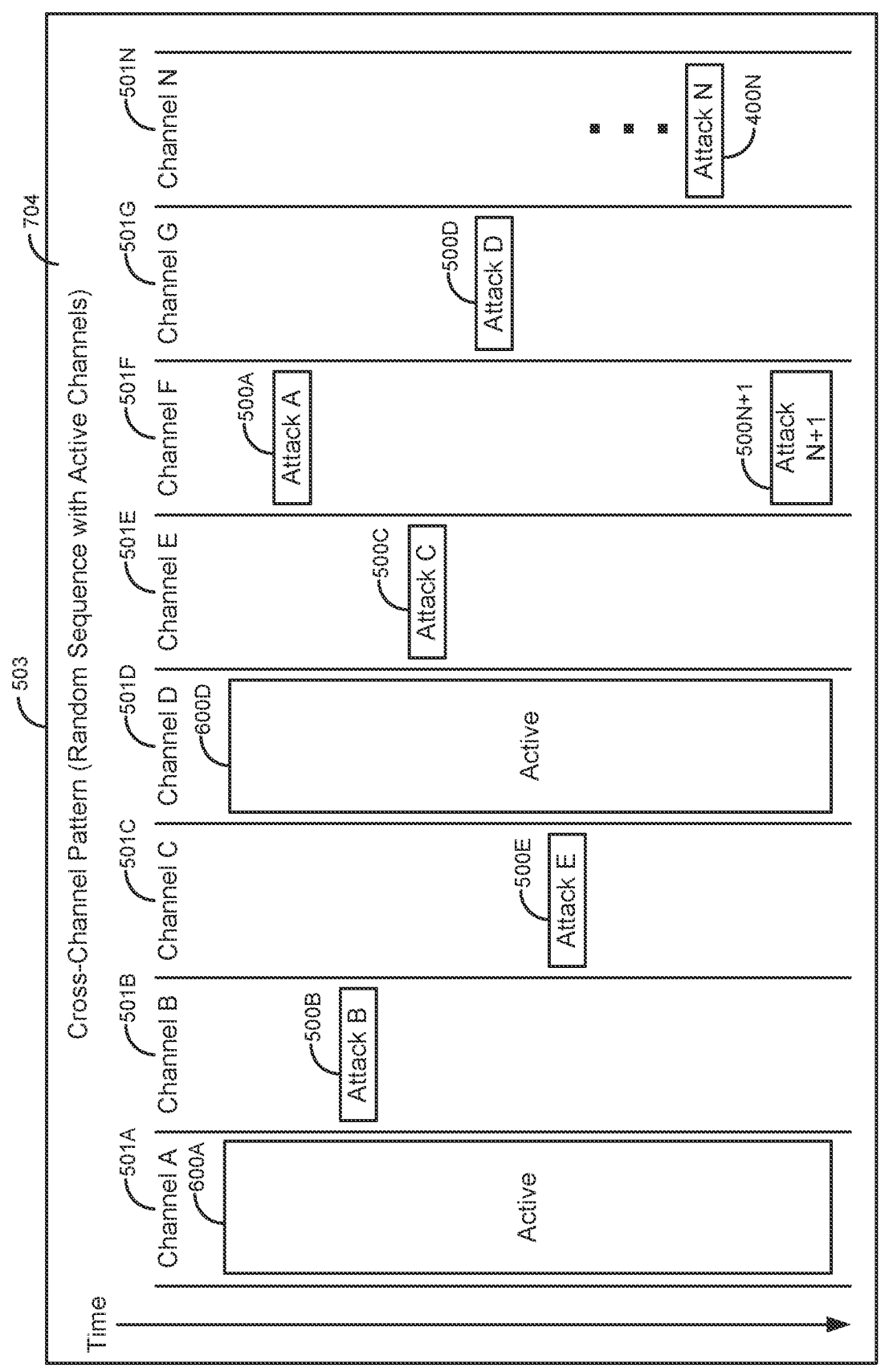
FIG. 7 is a diagram of a graphical user interface that shows a time view of a random anomalous cross-channel pattern with active channels.

FIG. 7 is a diagram of a graphical user interface 503 that shows a time view of a random anomalous cross-channel pattern with active channels 704. The time view of a random cross-channel pattern with active channels 704 shows that there are two active channels 600A and 600D (in channels 501A/501D). As one can see, the attacks 500A-500N occur in random order over time in the channels 501F, 501B, 501E, 501G, 501C, and 501N. In this example, the random pattern repeats as shown by attack 500N+1.

As one can envision, different combinations of the attacks described in FIGS. 4-7 and described herein may be represented in the graphical user interface 503. For example, the time view of a random cross-channel pattern with active channels 704 may not have any active channels 600. In one embodiment, the attack pattern may not repeat, but will be completely random each time or instead of repeating the same pattern, the second attack pattern may be in reverse order.

In addition, the information displayed may be different based on the kind of attack. For example, if the pattern is a ping attack, the attack 500 may indicate that it is a ping attack. Likewise, if the attack is a connection attack with random MAC addresses, the attack 500 may show the random MAC addresses and indicate that the attack is a connection attack with random MAC addresses. An alternative is where the user could click on the attack 500 and view more detailed information about the type of attack. One of skill in the art would recognize various combinations of displays of the data can be envisioned.

While the time views of FIGS. 5-7 only show a single type of anomalous cross-channel pattern, the time views of FIGS. 5-7 may show multiple types of anomalous cross-channel patterns that occur over time. For example, in FIG. 5, the sequential anomalous cross-channel pattern may change to a random anomalous cross-channel pattern or an anomalous cross-channel pattern with active channels. In this example, the graphical user interface 503 may have scroll bars that allow the user to view the anomalous cross-channel patterns as they occur over time (e.g., in real-time).

Figure 8:
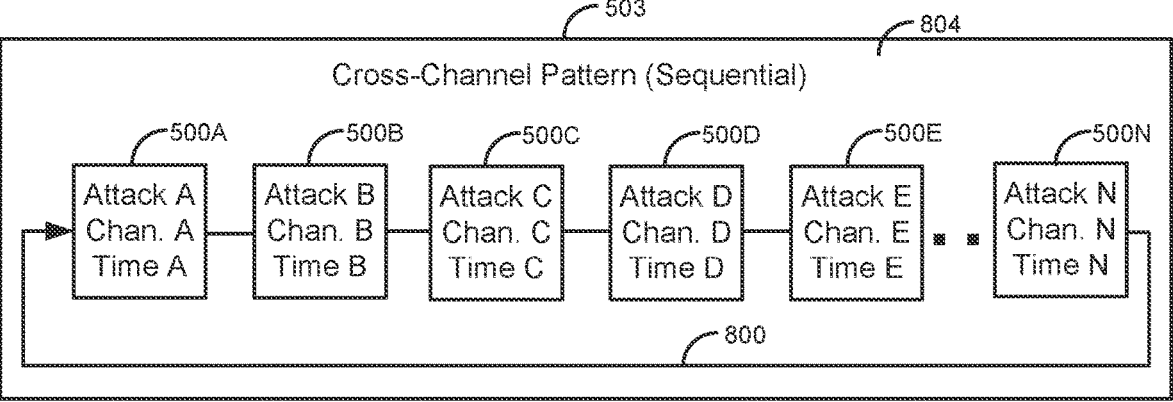
FIG. 8 is a diagram of a graphical user interface that shows sequence a view of an anomalous sequential cross-channel pattern.

FIG. 8 is a diagram of a graphical user interface 503 that shows a sequence view of an anomalous sequential cross-channel pattern 804. The sequence view of the sequential cross-channel pattern 804 shows a different view of the data displayed in FIG. 5. The sequence view of a sequential cross-channel pattern 804 comprises attacks 500A-500N (in the same order as shown in FIG. 5). However, instead of being shown in a time view like in FIG. 5, FIG. 8 shows the sequence view of a sequential cross-channel pattern 804. The sequence view of a sequential cross-channel pattern 804 shows the order of the sequence of the attacks 500A-500N and that the attacks 500A-500N repeat over time (indicated by loop 800). The loop 800 may also indicate the number of times the attack has been repeated.

Figure 9:
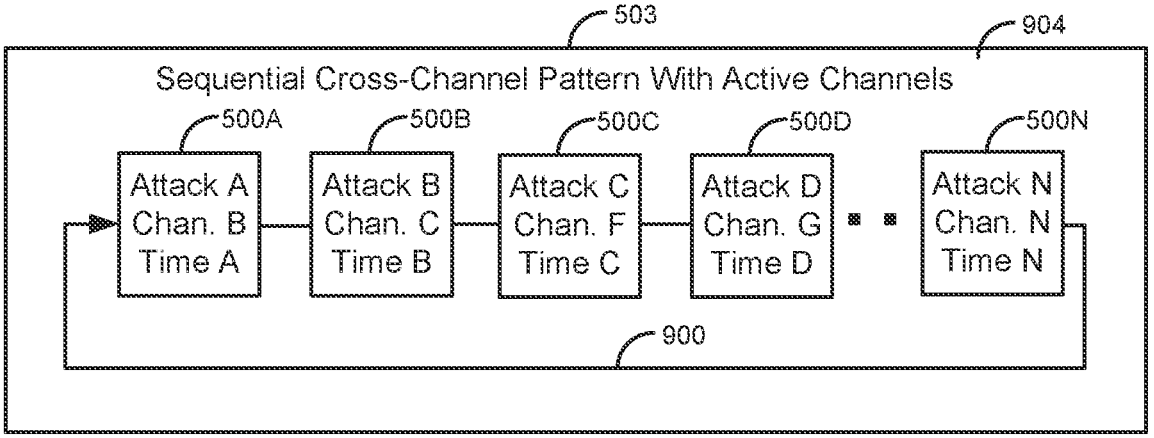
FIG. 9 is a diagram of a graphical user interface that shows a sequence view of an anomalous sequential cross-channel pattern with active channels.

FIG. 9 is a diagram of a graphical user interface 503 that shows an anomalous sequence view of a sequential cross-channel pattern with active channels 904. The sequence view of a sequential cross-channel pattern with active channels 904 shows a different view of the data displayed in FIG. 6. The sequence view of a sequential cross-channel pattern with active channels 904 comprises attacks 500A-500N (in the same order as shown FIG. 6). However, instead of being shown in a time view like in FIG. 6, FIG. 9 shows the sequence view of a sequential cross-channel pattern with active channels 904. The sequence view of a sequential cross-channel pattern with active channels 904 shows the order of the sequence of the attacks 500A-500N and that the attacks 500A-500N repeat over time (indicated by loop 900). The loop 900 may also indicate the number of times the attack has been repeated.

In one embodiment, the active channels 600 may also be shown in the sequence view of a sequential cross-channel pattern with active channels 904. For example, the active channels 600 may be listed at the bottom of the graphical user interface 503.

Figure 10:
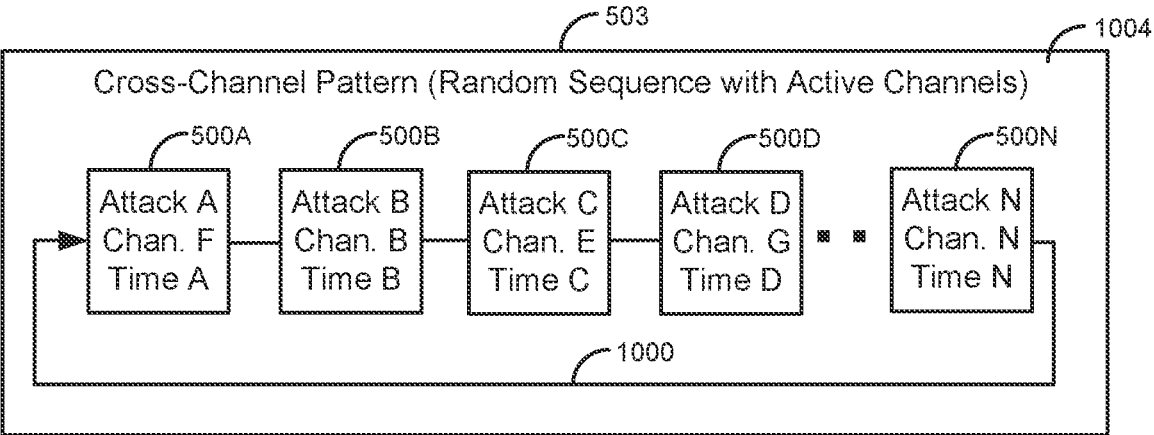
FIG. 10 is a diagram of a graphical user interface that shows a sequence view of a random anomalous cross-channel pattern with active channels.

FIG. 10 is a diagram of a graphical user interface 503 that shows a sequence view of a random anomalous cross-channel pattern with active channels 1004. The sequence view of a random cross-channel pattern with active channels 1004 shows a different view of the data displayed in FIG. 7. The sequence view of a random cross-channel pattern with active channels 1004 comprises attacks 500A-500N (in the same order as shown in FIG. 7). However, instead of being shown in a time view like FIG. 7, FIG. 10 shows the sequence view of the random cross-channel pattern with active channels 1004. The sequence view of a random cross-channel pattern with active channels 1004 shows the order of the sequence of the attacks 500A-500N and that the attacks 500A-500N repeat over time (indicated by loop 1000). The loop 1000 may also indicate the number of times the attack has been repeated.

In one embodiment, the active channels 600 may also be shown in the sequence view of a random cross-channel pattern with active channels 1004. For example, the active channels 600 may be listed at the bottom of the graphical user interface 503.

Figure 11:
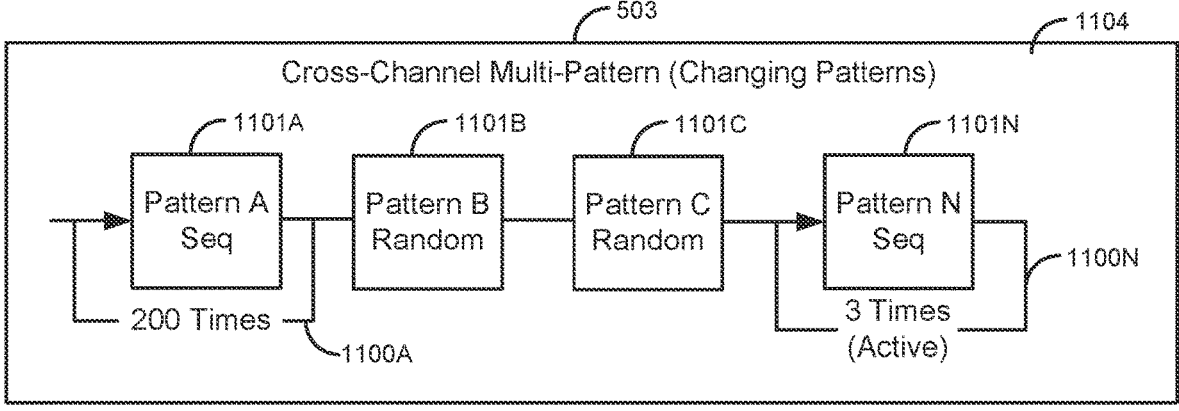
FIG. 11 is a diagram of a graphical user interface that shows a pattern view of a plurality of anomalous cross-channel patterns.

FIG. 11 is a diagram of a graphical user interface 503 that shows a pattern view of a plurality of anomalous cross-channel patterns 1104. In FIG. 11, each individual anomalous cross-channel pattern 1101A-1101N is shown in the order that each of anomalous cross-channel patterns occur over time. Individual anomalous cross-channel patterns may have a loop 1100 where the anomalous cross-channel pattern is repeated. For example, the anomalous cross-channel patterns 1101A and 1101N have loops 1100A and 1100N. The loop 1100A shows that the anomalous cross-channel pattern 1101A repeated two hundred times and the anomalous cross-channel pattern 1101N shows that the anomalous cross-channel pattern 1101N has repeated three times. The graphical user interface 503 may also indicate whether the last anomalous cross-channel pattern 1101N is still active.

If the anomalous cross-channel pattern 1101 does not repeat for any of the sequences but changes (e.g., the attack is completely random or only occurs once), instead of having a loop 1100, the anomalous cross-channel pattern 1101 will just continue in a straight line like displayed for the anomalous cross-channel patterns 1101B-1101C. Thus, the displayed anomalous cross-channel patterns 1101 may be a combination of anomalous cross-channel patterns 1101 with loops 1100 and without loops 1100.

If the user wants to see details of any of the anomalous cross-channel patterns 1101, the user may be able to click on an individual anomalous cross-channel pattern. For example, the user may click on the anomalous cross-channel pattern 1101A to display a similar view as shown in FIG. 5 or FIG. 8. This allows the user to easily drill down from a high level to a low-level view. This dramatically improves the user's ability to identify and respond to different types of malicious attacks.

If there are too many anomalous cross-channel patterns 1101 to display in the graphical user interface 503, the user can then scroll through the sequence to see the anomalous cross-channel patterns 1101 over time. For example, the pattern view of a plurality of anomalous cross-channel patterns 1104 may have a scroll bar that allows the user to scroll the pattern view of a plurality of anomalous cross-channel patterns 1104 to see each of the anomalous cross-channel patterns 1101 as they are created in real-time. In other words, a scrolling view of the anomalous cross-channel patterns 1101 can dynamically be displayed to the user in real-time.

The diagrams of FIGS. 5-11 allow a user to easily identify the malicious cross-channel patterns 1101. The diagrams of FIGS. 5-11 allow a user to clearly see the cross-channel patterns in intuitive ways that make the detection of malicious cross-channel attacks much easier to identify; this allows the user to quickly take the necessary action(s) to prevent an anomalous cross-channel attack before the private network 110P becomes compromised via the spread-spectrum network 110S. in addition, the diagrams of FIGS. 5-11 dramatically simplify the user's ability to identify any new or existing anomalous cross-channel patterns.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive data transmitted across a plurality of channels of a spread-spectrum network, the transmitted data comprising header information, the header information comprising data link layer information, network layer information, transport layer header information, session layer header information, presentation layer header information, and application layer header information, and payload information;

analyze the transmitted data of the plurality of channels of the spread-spectrum network to identify one or more cross-channel patterns defined by the transmitted data;

compare the identified one or more cross-channel patterns defined by the transmitted data against one or more known malicious cross-channel patterns to identify an anomalous cross-channel pattern across the plurality of channels of the spread-spectrum network; and in response to identifying the anomalous cross-channel pattern across the plurality of channels of the spread-spectrum network, take an action to protect the spread-spectrum network.

2. The system of claim 1, wherein analyzing the data of the plurality of channels of the spread-spectrum network is done in real-time, wherein the comparing comprises comparing the one or more cross-channel patterns defined by the transmitted data against one or more learned normal cross-channel patterns to determine a variance from normal cross-channel patterns, and wherein the anomalous cross-channel pattern is based on a magnitude of the determined variance.

3. The system of claim 2, wherein the microprocessor readable and executable instructions further cause the microprocessor to:

capture, in real-time, the transmitted data of the plurality of channels of the spread-spectrum network; and send, in real-time, the transmitted data of the plurality of channels of the spread-spectrum network.

4. The system of claim 1, wherein the anomalous cross-channel pattern comprises at least one of: a sequential cross-channel pattern, a sequential cross-channel pattern with one or more active channels, a random sequence cross-channel pattern, a random sequence channel pattern with one or more active channels, a ping cross-channel pattern, a failed connection cross-channel pattern, a changing port cross-channel pattern, a new cross-channel hopping pattern, a new inbound cross-channel connection pattern, a new outbound cross-channel connection pattern, and a Denial-of-Service (DoS) cross-channel pattern.

5. The system of claim 4, wherein the anomalous cross-channel pattern comprises one of: the sequential cross-channel pattern, the sequential cross-channel pattern with one or more active channels, the random sequence cross-channel pattern, the random sequence channel pattern with one or more active channels, and the failed connection cross-channel pattern, and wherein the anomalous cross-channel pattern further comprises use of a different Media Access Control (MAC) address for each individual channel that is part of the anomalous cross-channel pattern.

6. The system of claim 1, wherein comparing comprises comparing information in a selected one of the data link layer information, network layer information, transport layer header information, session layer header information, presentation layer header information, application layer header information and payload information in the identified anomalous cross-channel pattern to the one of the data link layer information, network layer information, transport layer header information, session layer header information, presentation layer header information, application layer header information and payload information in the one or more known malicious cross-channel patterns.

7. The system of claim 6, wherein the microprocessor readable and executable instructions further cause the microprocessor to:

retrieve the one or more known malicious cross-channel patterns via a malicious cross-channel pattern database, wherein the malicious cross-channel pattern database is part of a network service provided by a third-party.

8. The system of claim 1, wherein the microprocessor readable and executable instructions further cause the microprocessor to:

analyze historical data of the plurality of channels of the spread-spectrum network to identify one or more normal cross-channel patterns of the plurality of channels of the spread-spectrum network, and wherein the comparing is based on identifying a variance from the one or more normal cross-channel patterns of the plurality of channels of the spread-spectrum network.

9. The system of claim 1, wherein the microprocessor readable and executable instructions further cause the microprocessor to:

generate for display, in a graphical user interface, a diagram that comprises at least one of a time-based view, a sequence view, and a pattern view of the anomalous cross-channel pattern.

10. The system of claim 9, wherein the diagram comprises the pattern view, wherein the pattern view comprises a plurality of anomalous cross-channel patterns, and wherein the plurality of anomalous cross-channel patterns comprises at least one anomalous cross-channel pattern that has a loop and at least one anomalous cross-channel pattern that does not have a loop.

11. The system of claim 9, wherein the diagram comprises the time-based view and wherein the time-based view comprises a plurality of different anomalous cross-channel patterns.

12. A method comprising:

receiving, by a microprocessor, data transmitted across a plurality of channels of a spread-spectrum network, the transmitted data comprising header information, the header information comprising data link layer information, network layer information, transport layer header information, session layer header information, presentation layer header information, and application layer header information, and payload information;

analyzing, by the microprocessor, the transmitted data of the plurality of channels of the spread-spectrum network to identify one or more cross-channel patterns defined by the transmitted data;

comparing the one or more cross-channel patterns defined by the transmitted data against one or more learned normal cross-channel patterns to determine a variance from normal cross-channel patterns to identify an anomalous cross-channel pattern across the plurality of channels of the spread-spectrum network, wherein the anomalous cross-channel pattern is identified based on a magnitude of the determined variance; and in response to identifying the anomalous cross-channel pattern across the plurality of channels of the spread-spectrum network, taking, by the microprocessor, an action to protect the spread-spectrum network.

13. The method of claim 12, wherein analyzing the transmitted data of the plurality of channels of the spread-spectrum network is done in real-time and further comprising:

capturing, in real-time, the transmitted data of the plurality of channels of the spread-spectrum network;

sending, in real-time, the transmitted data of the plurality of channels of the spread-spectrum network; and comparing the identified one or more cross-channel patterns defined by the transmitted data against one or more known malicious cross-channel patterns to identify an anomalous cross-channel patter across the plu-
rality of channels of the spread-spectrum network.

14. The method of claim 12, wherein the anomalous
cross-channel pattern comprises at least one of: a sequential
cross-channel pattern, a sequential cross-channel pattern
with one or more active channels, a random sequence
cross-channel pattern, a random sequence channel pattern
with one or more active channels, a ping cross-channel
pattern, a failed connection cross-channel pattern, a chang-
ing port cross-channel pattern, a new cross-channel hopping
pattern, a new inbound cross-channel connection pattern, a
new outbound cross-channel connection pattern, and a
Denial-of-Service (DoS) cross-channel pattern.

15. The method of claim 12, wherein the comparing
comprises comparing information in a selected one of the
data link layer information, network layer information,
transport layer header information, session layer header
information, presentation layer header information, applica-
tion layer header information and payload information in the
identified anomalous cross-channel pattern to the one of the
data link layer information, network layer information,
transport layer header information, session layer header
information, presentation layer header information, applica-
tion layer header information and payload information in a
known malicious cross-channel pattern.

16. The method of claim 12, further comprising:
analyzing historical data of the plurality of channels of the
spread-spectrum network to identify the one or more
learned normal cross-channel patterns of the plurality
of channels of the spread-spectrum network, and
wherein the comparing comprises comparing information
in a selected one of the data link layer information,
network layer information, transport layer header infor-
mation, session layer header information, presentation
layer header information, application layer header
information and payload information in the anomalous
identified cross-channel pattern to the one of the data
link layer information, network layer information,
transport layer header information, session layer header
information, presentation layer header information,
application layer header information and payload infor-
mation in the one or more learned normal cross-
channel.

17. The method of claim 12, further comprising:
generating for display, in a graphical user interface, a
diagram that comprises at least one of a time-based
view, a sequence view, and a pattern view of the
anomalous cross-channel pattern.

18. The method of claim 17, wherein the diagram com-
prises the pattern view, wherein the pattern view comprises
a plurality of anomalous cross-channel patterns, and wherein
the plurality of anomalous cross-channel patterns comprises
at least one anomalous cross-channel pattern that has a loop
and at least one anomalous cross-channel pattern that does
not have a loop.

19. The method of claim 17, wherein the diagram com-
prises the time-based view and wherein the time-based view
comprises a plurality of different anomalous cross-channel
patterns.

20. A non-transient computer readable medium having
stored thereon instructions that cause a processor to execute
a method, the method comprising instructions to:
receive data of a plurality of channels of a spread-
spectrum network;
analyze the data of the plurality of channels of the
spread-spectrum network to identify an anomalous
cross-channel pattern across the plurality of channels of
the spread-spectrum network;
generate for display, in a graphical user interface, a
diagram that comprises at least one of a time-based
view, a sequence view, and a pattern view of the
anomalous cross-channel pattern, wherein the diagram
comprises the pattern view, wherein the pattern view
comprises a plurality of anomalous cross-channel pat-
terns, and wherein the plurality of anomalous cross-
channel patterns comprises at least one anomalous
cross-channel pattern that has a loop and at least one
anomalous cross-channel pattern that does not have a
loop; and
in response to identifying the anomalous cross-channel
pattern across the plurality of channels of the spread-
spectrum network, take an action to protect the spread-
spectrum network.

\* \* \* \* \*